(12) United States Patent
Bartchlett

(10) Patent No.: US 11,576,540 B2
(45) Date of Patent: Feb. 14, 2023

(54) COMPACT COMPOSTING TOILET

(71) Applicant: MEDAL TECHNOLOGIES, LLC, Findlay, OH (US)

(72) Inventor: Kevin A. Bartchlett, Arcadia, OH (US)

(73) Assignee: MEDAL TECHNOLOGIES, LLC, Findlay, OH (US)

(*) Notice: Subject to any disclaimer, the term of this patent is extended or adjusted under 35 U.S.C. 154(b) by 0 days.

(21) Appl. No.: 17/168,864

(22) Filed: Feb. 5, 2021

(65) Prior Publication Data

US 2021/0244242 A1 Aug. 12, 2021

Related U.S. Application Data

(60) Provisional application No. 62/970,887, filed on Feb. 6, 2020.

(51) Int. Cl.
*A47K 11/02* (2006.01)

(52) U.S. Cl.
CPC ................................. *A47K 11/02* (2013.01)

(58) Field of Classification Search
CPC .......... A47K 11/02; A47K 11/04; A61G 9/00; A61G 9/003; E03D 5/014; B60R 15/04
USPC ..................................... 4/319–320
See application file for complete search history.

(56) References Cited

U.S. PATENT DOCUMENTS

| | | | |
|---|---|---|---|
| 3,840,907 A | 10/1974 | Sundberg | |
| 5,303,431 A | 4/1994 | Johansson | |
| 5,501,978 A * | 3/1996 | Sundberg | A47K 11/02 4/449 |
| 9,247,852 B2 * | 2/2016 | Trott | A47K 11/02 |
| 9,867,511 B1 * | 1/2018 | Wilburg | A47K 11/023 |
| 2005/0055758 A1 * | 3/2005 | Marston | E03D 11/11 4/321 |
| 2007/0130678 A1 | 6/2007 | Ikeda et al. | |
| 2007/0225667 A1 * | 9/2007 | Otto | A61G 9/00 604/317 |
| 2008/0168597 A1 * | 7/2008 | Bartlett | E03D 11/11 4/321 |
| 2012/0124731 A1 | 5/2012 | Trott | |
| 2013/0298324 A1 | 11/2013 | Dreher | |

* cited by examiner

*Primary Examiner* — Janie M Loeppke

(74) *Attorney, Agent, or Firm* — Jacob M. Ward; Ward Law Office LLC

(57) ABSTRACT

A composting toilet assembly can include a housing. The housing can form an enclosed cavity. A toilet bowl can have a main body disposed in the housing. A drain pan can be disposed under the toilet bowl and in fluid communication with the toilet bowl. A diversion plate can be disposed in the housing under the toilet bowl. A liquid waste bottle can be removably disposed in the housing. The liquid waste bottle in fluid can be in communication with the drain pan and configured to receive liquid waste from the drain pan. A composting bin can be disposed in the enclosed cavity of the housing. The composting bin can be adjacent to and in communication with the diversion plate.

19 Claims, 7 Drawing Sheets

COMPACT COMPOSTING TOILET

CROSS-REFERENCE TO RELATED APPLICATIONS

This application claims the benefit of U.S. Provisional Application Ser. No. 62/970,887 filed on Feb. 6, 2020. The entire disclosure of the above application is incorporated herein by reference.

FIELD

The present disclosure relates to toilets and, more specifically, to a composting toilet.

INTRODUCTION

This section provides background information related to the present disclosure which is not necessarily prior art.

Traditional composting toilets provide a portable toilet option without the use of chemicals. Composting toilets typically have a receptacle into which both fecal matter and urine fall. These toilets require a user to drop peat moss into the composting chamber after each use in order to absorb excess urine, since otherwise the excess urine reduces the rate of composting of the fecal matter. While such toilets have been found to be effective, they require that a supply of peat moss be maintained on hand. The addition of peat moss after each use makes the composting chamber fill up quickly, thereby reducing the efficiency of the toilet.

There are known composting toilets that separate urine from fecal matter. However, any liquid waste in the fecal matter will end up in the composting chamber. As a result, it is still necessary to absorb excessive liquid from the composting chamber using peat moss or a similar absorbent material. Additionally, known composting toilets are often not very durable, bulky in shape and size, and difficult to use and maintain.

Traditional composting toilets can present further issues, including where such toilets can be large and cumbersome, which is contrary to portability. The size of these composting toilets can make them an undesirable option for certain applications, including uses in recreational vehicles such as motorhomes, campervans, caravans, fifth-wheel trailers, popup campers, and truck campers. Recreational vehicles have finite amounts of space, where certain configurations cannot accommodate a traditional composting toilet.

There is a continuing need for a composting toilet that is compact with minimal projections. Desirably, the composting toilet would be durable, efficient, and have features configured to improve the ease of use for the user.

SUMMARY

In concordance with the instant disclosure, a composting toilet that is compact with minimal projections, which is durable, efficient, and has features configured to improve the ease of use for the user, has surprisingly been discovered.

In certain embodiments, a composting toilet assembly can include a housing. The housing can form an enclosed cavity. A toilet bowl can have a main body disposed in the housing. A drain pan can be disposed under the toilet bowl and in fluid communication with the toilet bowl. A diversion plate can be disposed in the housing under the toilet bowl. A liquid waste bottle can be removably disposed in the housing. The liquid waste bottle can be in fluid communication with the drain pan and configured to receive liquid waste from the drain pan. A composting bin can be disposed in the enclosed cavity of the housing. The composting bin can be adjacent to and in communication with the diversion plate.

In an exemplary embodiment, a composting toilet assembly has a housing, a toilet bowl, a urine bottle, and a composting bin. The housing has a base, a lid, a front wall, a rear wall, a first side wall, and a second side wall forming an enclosed cavity. The toilet bowl has a main body with a seat portion, a recess having a first portion and a second portion, and a partition wall disposed in the recess between the first portion and the second portion. The partition wall extends upwardly and has a top edge. A first opening in the first portion receives urine, and a second opening in the second portion receives fecal matter. A drain pan disposed under the first portion of the toilet bowl is in fluid communication with the first opening. A diversion plate hingedly connected to the drain pan is disposed under the second portion of the toilet bowl and is in communication with the second opening of the toilet bowl. A liquid waste bottle is removably disposed in a bottle compartment integrally formed in the front wall of the housing. The liquid waste bottle has an intake aperture in fluid communication with a drain opening disposed in a bottom surface of the drain pan and is configured to receive urine and liquid waste from the drain pan. A composting bin is disposed in the cavity of the housing and is adjacent to and in communication with the diversion plate and the second opening. The composting bin has an agitator.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
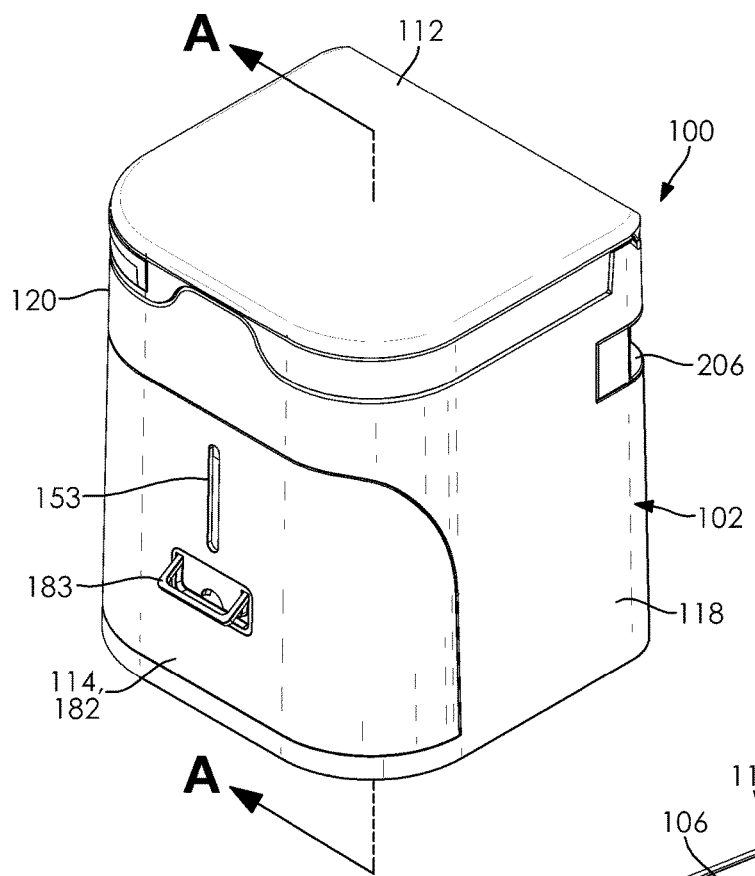
FIG. 1 is a top perspective view of a composting toilet assembly according to one embodiment of the present disclosure.
Figure 2:
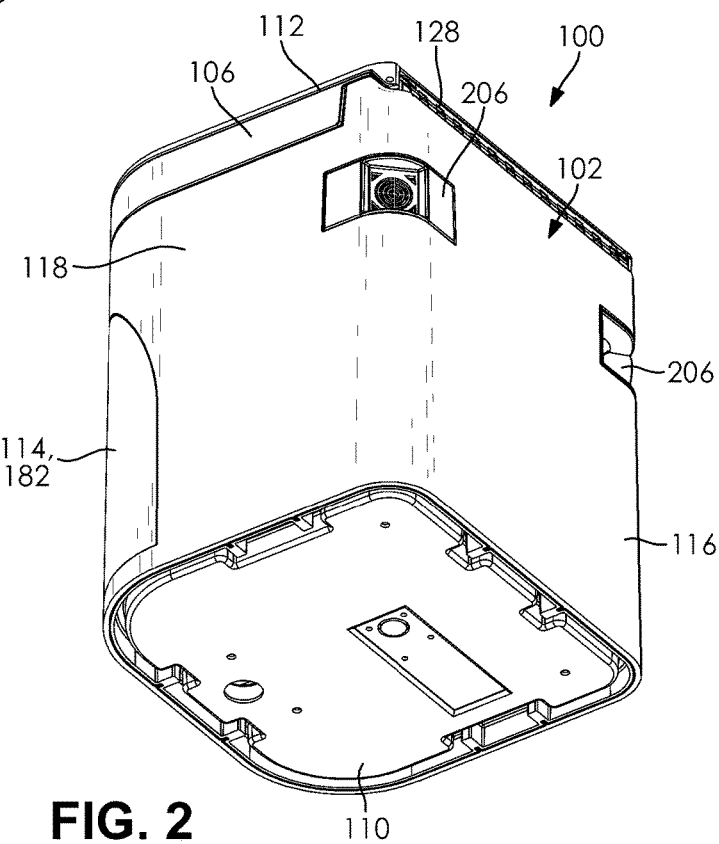
FIG. 2 is a bottom perspective view of the compositing toilet assembly shown in FIG. 1.
Figure 8:
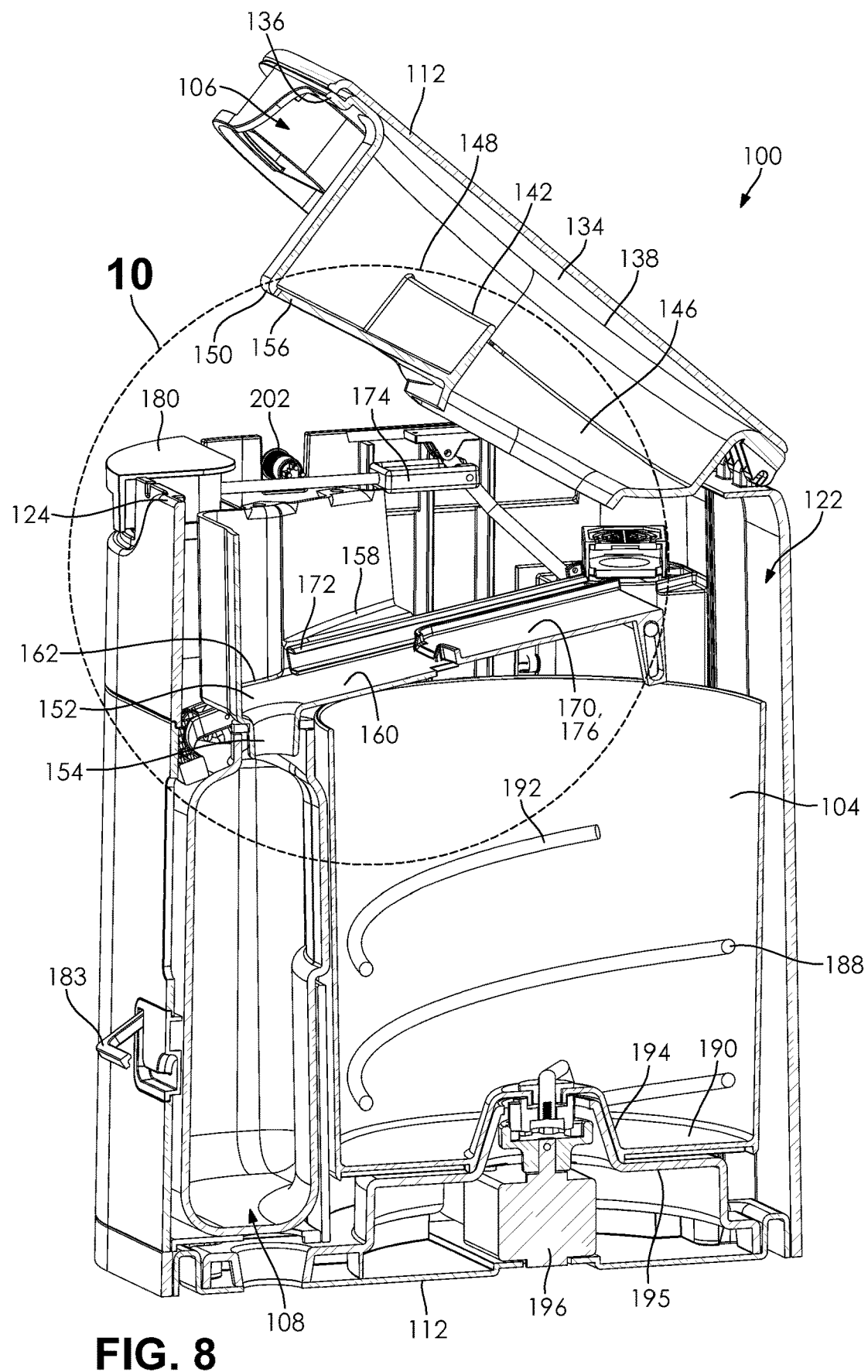
FIG. 8 is a cross-sectional, top perspective view of the composting toilet assembly taken at section line A-A in FIG. 1, further depicting interior structures of the composting toilet assembly and a seat portion in a partially raised position.
Figure 10:
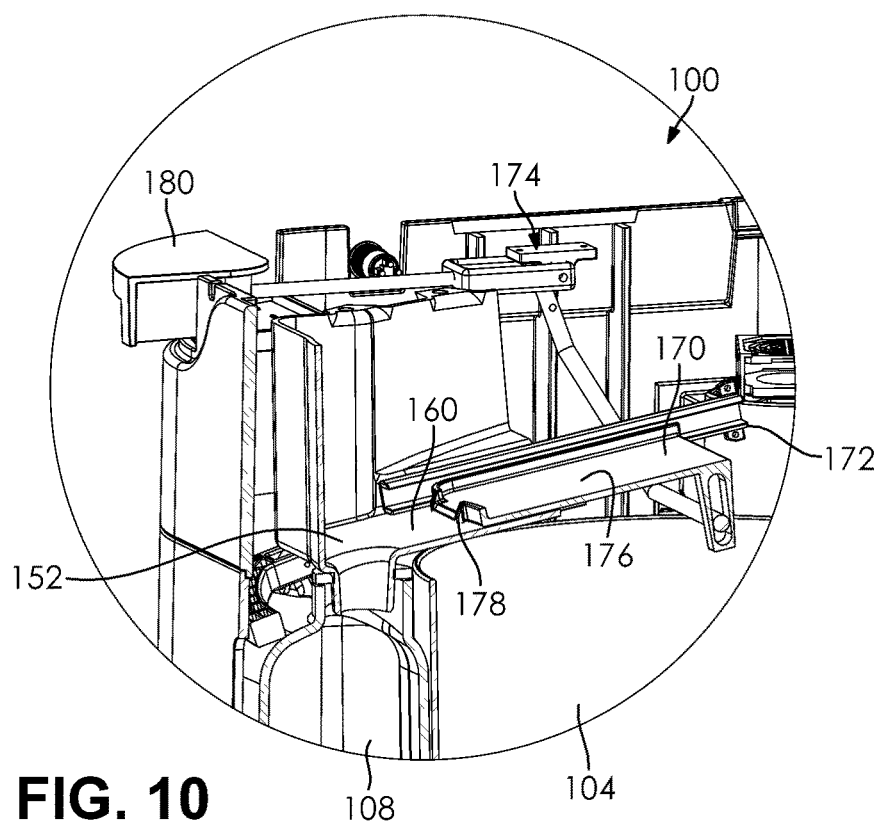
Figure 11:
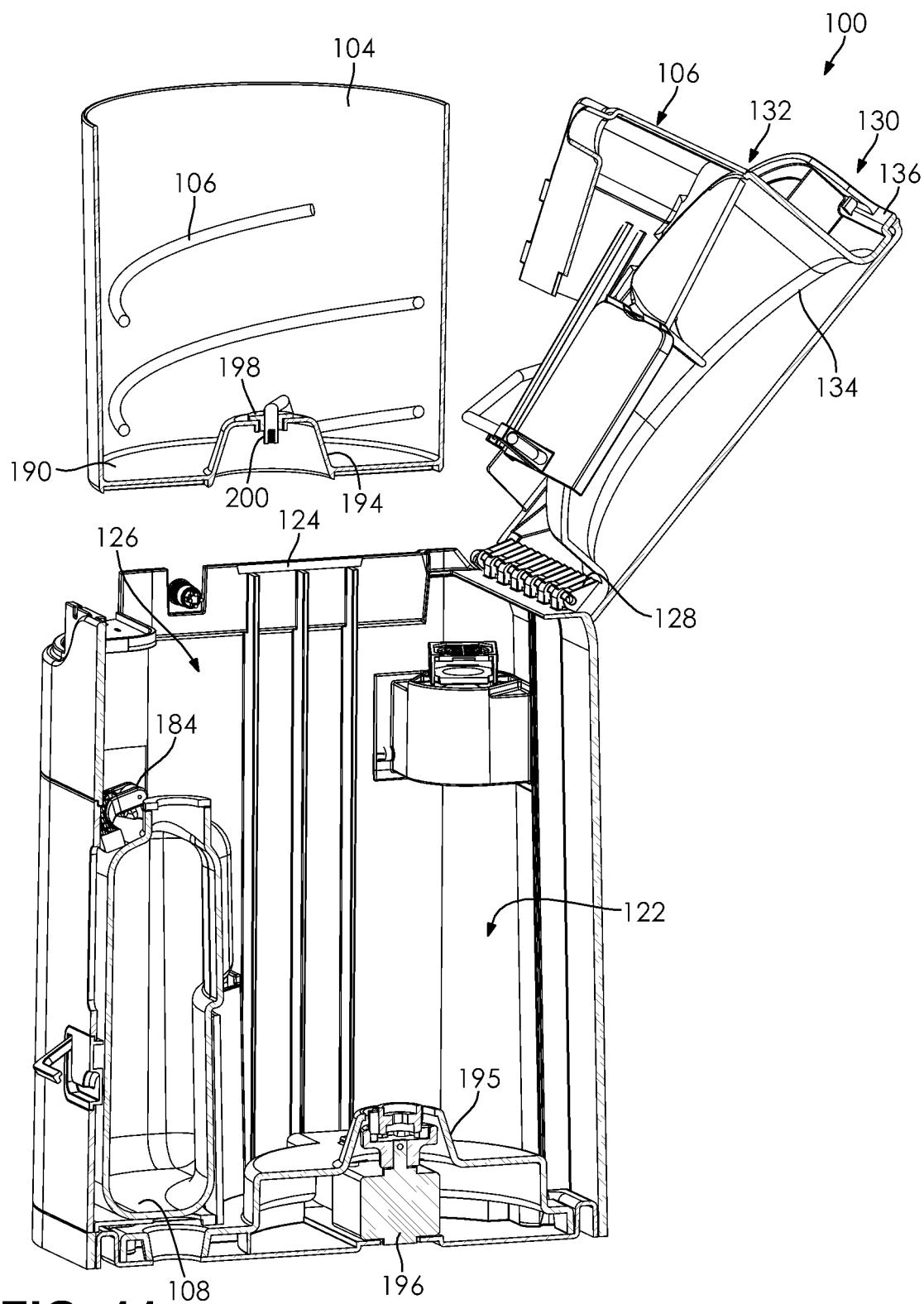

FIG. 10 is an enlarged, cross-sectional, top perspective view of the composting toilet assembly taken at callout 10 in FIG. 8, further depicting an actuator of the diversion plate; and FIG. 11 is a cross-sectional, top perspective view of the composting toilet assembly taken at section line A-A in FIG. 1, further depicting the seat portion in a raised position and a composting bin removed from the composting toilet assembly.

DETAILED DESCRIPTION

The following description of technology is merely exemplary in nature of the subject matter, manufacture and use of one or more inventions, and is not intended to limit the scope, application, or uses of any specific invention claimed in this application or in such other applications as can be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items can be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that can arise from ordinary methods of measuring or using such parameters.

Although the open-ended term "comprising," as a synonym of non-restrictive terms such as including, containing, or having, is used herein to describe and claim embodiments of the present technology, embodiments can alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that can be recited in the art, even though element D is not explicitly described as being excluded herein.

When an element or layer is referred to as being "on," "engaged to," "connected to," or "coupled to" another element or layer, it can be directly on, engaged, connected or coupled to the other element or layer, or intervening elements or layers can be present. In contrast, when an element is referred to as being "directly on," "directly engaged to," "directly connected to" or "directly coupled to" another element or layer, there can be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. can be used herein to describe various elements, components, regions, layers and/or sections, these elements, components, regions, layers and/or sections should not be limited by these terms. These terms can be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, can be used herein for ease of description to describe one element or feature's relationship to another element(s) or feature(s) as illustrated in the figures. Spatially relative terms can be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

As shown in FIGS. 1-11, a composting toilet assembly 100 can have a housing 102, a composting bin 104, a toilet bowl 106, and a liquid waste bottle 108. The housing 102 can have a base 110, a lid 112, a front wall 114, a rear wall 116, a first side wall 118, and a second side wall 120. The base 110, lid 112, front wall 114, rear wall 116, first side wall 118, and second side wall 120 can form an enclosed cavity 122 in which the composting bin 104, the toilet bowl 106, and the liquid waste bottle 108 can be disposed.

Advantageously, the lid 112 is configured to militate against undesirable odor emanating from the composting toilet assembly 100 when not in use. In particular embodiments, the composting bin 104 and the liquid waste bottle 108 are disposed in the cavity 122 of the housing 102 and covered entirely by the lid 112.

Figure 4:
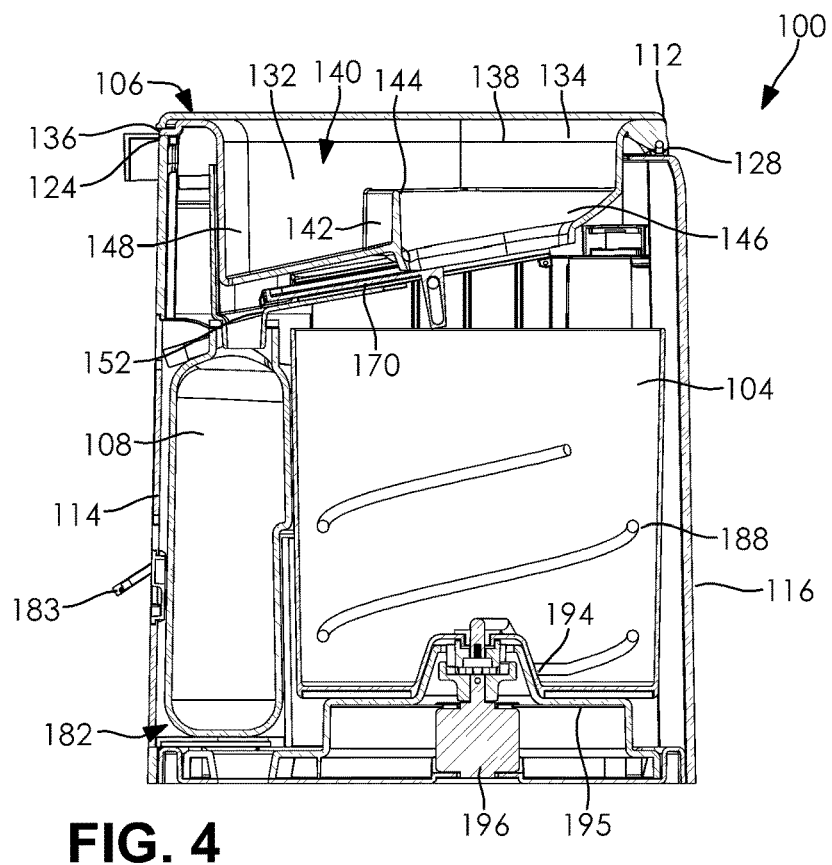
FIG. 4 is a cross-sectional, side elevational view of the composting toilet assembly taken at section line B-B in FIG. 3, further depicting interior structures of the composting toilet assembly.

It should be appreciated that the composting toilet assembly 100 of the present disclosure is configured to be compact. The housing 102 of the composting toilet assembly 100 can have an overall cuboid shape, including a substantially uniform rectangular cross-section, as shown in FIG. 4. Additionally, the housing 102 of the composting toilet assembly 100 is generally free of any projections. In other words, there are no portions of the composting toilet assembly 100, which extend beyond the walls 114, 116, 118, 120 of the housing 102. The compact nature of the housing 102 can allow the composting toilet assembly 100 to be particularly well suited for use in recreational vehicles, such as motorhomes, campervans, caravans, fifth-wheel trailers, popup campers, and truck campers. The general shape and form of the toilet assembly 100 maximizes storage efficiency and minimizes space requirements for placement in various storage areas and/or cubbies, such as those found in recreational vehicles.

Each of the base 110, the lid 112, the front wall 114, the rear wall 116, the first side wall 118, and the second side wall 120 can have a thickness that allows for durability and rigidity of the housing 102. In certain embodiments, each of the base 110, the lid 112, the front wall 114, the rear wall 116, the first side wall 118, and the second side wall 120 can have a thickness of about one quarter inch. Additional parts of the composting toilet assembly 100 can have a thickness of three sixteenth inch, as a non-limiting example, in certain embodiments. A skilled artisan can select other suitable thicknesses for each of the base 110, the lid 112, the front wall 114, the rear wall 116, the first side wall 118, the second side wall 120, and additional parts of the composting toilet assembly, as desired.

The dimensions of the housing 102 can be advantageously compact to allow the composting toilet assembly to be utilized in a recreational vehicle. In certain embodiments, the housing 102 of the composting toilet assembly 100 can measure about 19 inches high, about 15 inches wide, and about 16 inches long. A skilled artisan can select other suitable dimensions for the housing 102, which allow the composting toilet assembly 100 to be utilized in a recreational vehicle, as desired.

The housing 102, composting bin 104, toilet bowl 106, and liquid waste bottle 108 can be fabricated from a material that is light-weight and rigid to allow the composting toilet assembly 100 to be both portable and durable. For example, the housing 102, composting bin 104, toilet bowl 106, and liquid waste bottle 108 can be formed from a lightweight plastic material such as a polypropylene plastic material, as a non-limiting example. The housing 102, composting bin 104, toilet bowl 106, and liquid waste bottle 108 can be formed by a molding process such as rotation molding, as a non-limiting example. In other examples, the housing 102, composting bin 104, toilet bowl 106, and liquid waste bottle 108 can be formed from other suitable materials including other thermoplastic materials such as polyethylene, and non-thermoplastic materials such as metal. It should be appreciated that any suitable materials and manufacturing methods for the housing 102, composting bin 104, toilet bowl 106, and liquid waste bottle 108 can be employed, as desired.

In certain embodiments, the base 110, lid 112, front wall 114, rear wall 116, first side wall 118, and second side wall 120 can be fused or glued together at final assembly. In other embodiments, the base 110, the lid 112, the front wall 114, the rear wall 116, the first side wall 118, and the second side wall 120 can be attached with a mechanical fastener, for example, a bolt. A skilled artisan can select other suitable methods for connecting the base 110, the lid 112, the front wall 114, the rear wall 116, the first side wall 118, and the second side wall 120, as desired. Certain embodiments include where various components can be combined into integrated structures, such as where entireties or portions of the base 110, the front wall 114, the rear wall 116, the first side wall 118, and/or the second side wall 120 are commonly molded or formed.

The toilet bowl 106 can be positioned between a housing rim 124 formed by an upper edge 125 of the front wall 114, rear wall 116, first side wall 118, and second side wall 120 of the housing 102 and the adjacent lid 112. The housing rim 124 can circumscribe and define an opening 126. The toilet bowl 106 can connect to the housing rim 124 of the housing 102 along the rear wall 116 using a hinge 128. Accordingly, the hinge 128 can allow a user to lift a first end 130 of the toilet bowl 106 opposite the hinge 128 in an upward motion to access the composting bin 104 and the liquid waste bottle 108. Subsequently, the user can lower the first end 130 of the toilet bowl 106 to a position adjacent the front wall 114 when the composting toilet assembly 100 is in operation. A skilled artisan can select any suitable method to secure the toilet bowl 106 to the housing 102.

Figure 7:
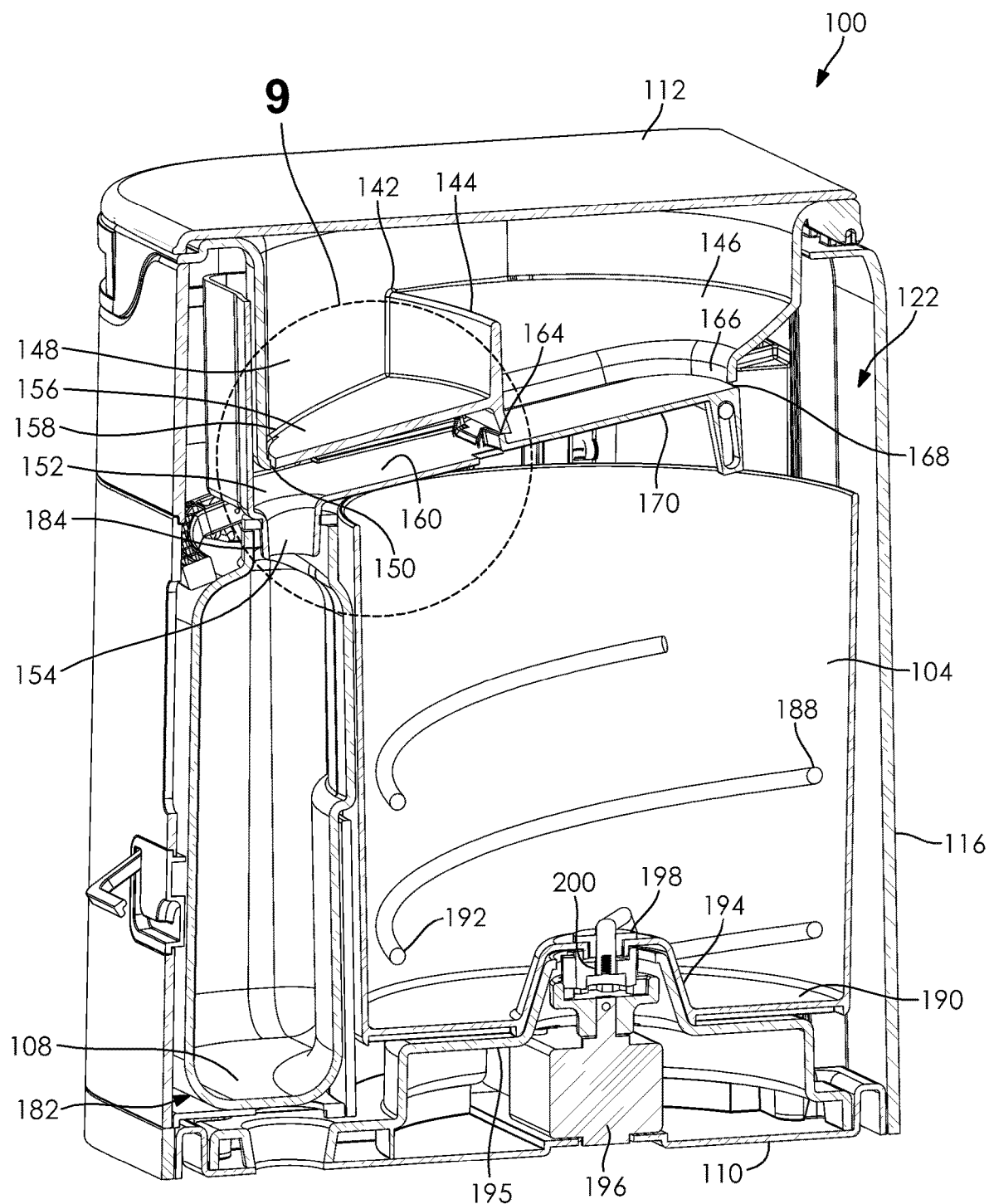
FIG. 7 is a cross-sectional, top perspective view of the composting toilet assembly taken at section line A-A in FIG. 1, further depicting interior structures of the composting toilet assembly.

As depicted in FIGS. 4 and 7, the toilet bowl 106 can include a base 132 and a seat portion 134. The base 132 of the toilet bowl 106 can have a base rim 136 that fits integrally with the housing rim 124 of the housing 102. The seat portion 134 can circumscribe and define an upper edge 138 of a recess 140 of the toilet bowl 106. Advantageously, the seat portion 134 can be ergonomically configured such that a user can comfortably sit upon the seat portion 134 while operating the composting toilet assembly 100.

The recess 140 can have a first partition wall 142 formed therein. The first partition wall 142 can have a top edge 144. The first partition wall 142 can divide the recess 140 into two separate portions, namely, a solids receptacle 146 and a urine receptacle 148. The urine receptacle 148 can be configured to receive urine, in operation. The solids receptacle 146 can be configured to receive fecal matter, in operation. Advantageously, the toilet bowl 106 of the present disclosure can provide a composting toilet assembly 100 that is easy to use and does not require additional efforts from the user to keep urine and liquid feces out of the composting bin 104.

It should be understood that the first partition wall 142 can militate against the undesirable mixing of urine and fecal matter within the recess 140 and in the composting bin 104, in operation. The first partition wall 142 can be configured to divert urine into the urine receptacle 148. The first partition wall 142 can have a height configured to allow the user to operate the composting toilet assembly 100 without interference from the first partition wall 142 while diverting urine to a first opening 150 disposed in the urine receptacle 148. The height of the first partition wall 142, and likewise the top edge 144 of the first partition wall 142, is such that the first partition wall 142 is within the recess 140 and thereby spaced apart from the upper edge 138 of the recess 140, for example, as shown in FIGS. 4 and 7. A skilled artisan can select any suitable height for the first partition wall 142, as desired.

With continued reference to FIGS. 4 and 7-10, the first opening 150 can be in fluid communication with a drain pan 152. The drain pan 152 can be disposed under the urine receptacle 148. The drain pan 152 can have a drain opening 154 that is in fluid communication with the liquid waste bottle 108. In operation, urine can enter the urine receptacle 148, pass through the first opening 150 onto the drain pan 152, and then through the drain opening 154 into the liquid waste bottle 108. The first opening 150 and the drain opening 154 can be directly or indirectly in communication with the liquid waste bottle 108.

The urine receptacle 148 can have a first inclined surface 156 and a first curved side wall 158. The first inclined surface 156 can extend from the first partition wall 142 to the first opening 150. The first curved side wall 158 can extend from the upper edge 138 to the first opening 150. The first inclined surface 156 and the first curved side wall 158 can be configured to divert urine to the first opening 150.

The drain pan 152 can have a second inclined surface 160 and a second curved side wall 162. The second inclined surface 160 can extend from a position adjacent to a second partition wall 164, the second partition wall 164 disposed adjacent the first partition wall 142, to the drain opening 154. The second curved side wall 162 can extend from a bottom surface of the urine receptacle 148 to the drain opening 154. The second inclined surface 160 and the second curved side wall 162 can be configured to divert urine and other liquid waste to the drain opening 154, which can be in fluid communication with the liquid waste bottle 108.

It should be appreciated that the first and second inclined surfaces 156, 160 and the first and second curved side walls 120, 162 can automatically divert urine. In other words, the urine can be diverted to the first opening 150 and the drain opening 154, respectively, automatically without any additional actions by the user. The urine receptacle 148 and the drain pan 152 are configured to provide an easy to use composting toilet assembly 100 for the user.

With continued reference to FIGS. 4 and 7, the solids receptacle 146 can be defined by the second partition wall 164 and a third curved sidewall 166. A second opening 168 formed in the solids receptacle 146 can be in communication with the composting bin 104. It should be appreciated that the second opening 168 is larger than the first opening 150 in order to accommodate the fecal matter. A skilled artisan can select any suitable size for the first opening 150 and the second opening 168, as desired.

Figure 9:
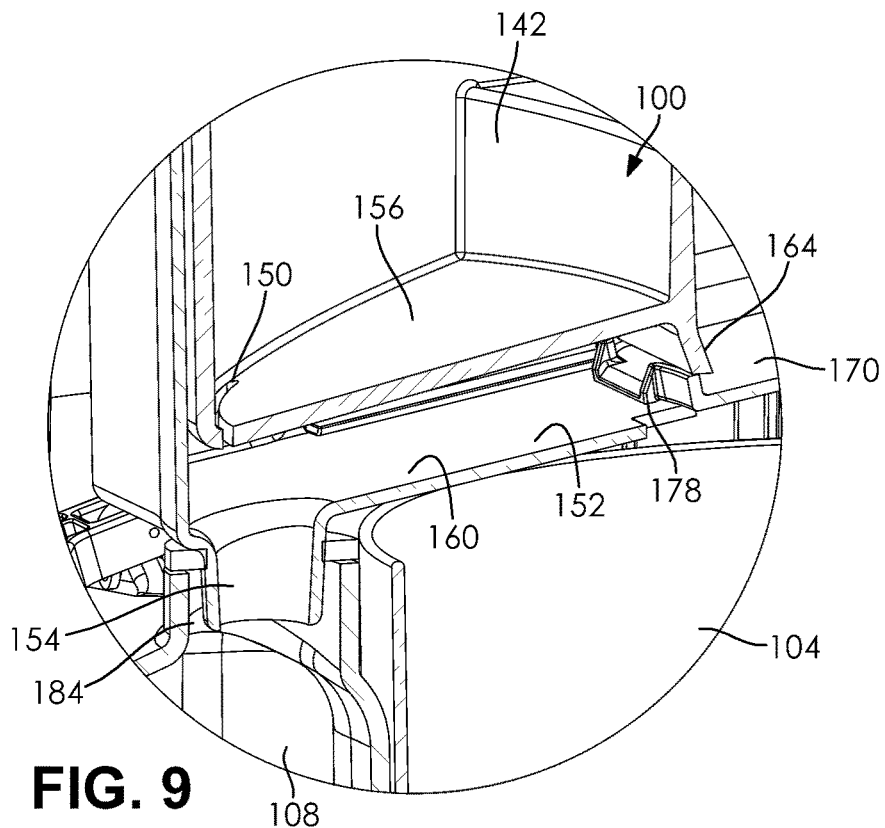
FIG. 9 is an enlarged, cross-sectional, top perspective view of the composting toilet assembly taken at callout 9 in FIG. 7, further depicting an interaction between a drain pan and a diversion plate.

A diversion plate 170 can be disposed under the second opening 168 of the solids receptacle 146. The diversion plate 170 can be an extension of the drain pan 152 in certain embodiments. The diversion plate 170 can be hingedly attached to the drain pan 152, as a non-limiting example. In certain embodiments, for example, as shown in FIGS. 8 and 10, the diversion plate 170 can be slidably disposed on a track 172 above the drain pan 152. In particular, the diversion plate 170 can have an actuator 174, which can control a slidable movement of the diversion plate 170 between a closed position and an open position. An open position of the diversion plate 170 is shown in FIGS. 4 and 10 and a closed position of the diversion plate is shown in FIGS. 7-9. When the diversion plate is in the closed position, the user can actuate the actuator 174, which can slide the diversion plate 170 along the tracks 172 above the drain pan 152, thus, placing the diversion plate 170 in the open position. When the diversion plate 170 is in the open position, for example, as shown in FIG. 10, the second opening 168 of the solids receptacle 146 can be in communication with the composting bin 104. In certain embodiments, substantially an entirety of the diversion plate 170 can advance up to the second partition wall 164, thereby providing access to substantially the whole of the second opening 168 of the solids receptacle 146, an example of which is shown in FIG. 4.

Advantageously, the slidable movement of the diversion plate 170 can utilize less space than a hinged door, which can allow the composting toilet assembly 100 to remain compact. A skilled artisan can select other suitable methods of connecting the drain pan 152 and the diversion plate 170, as desired.

Figure 6:
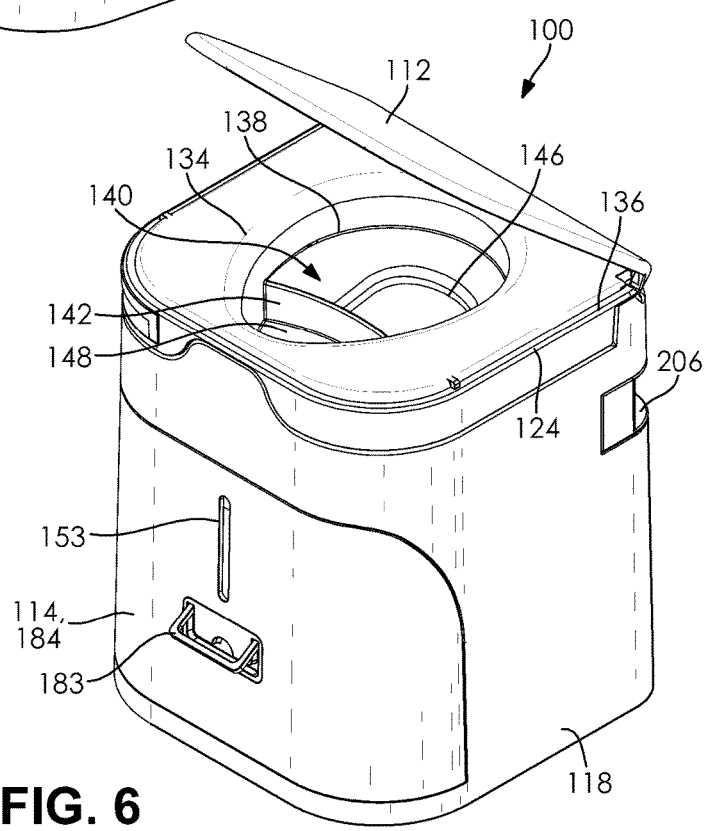
FIG. 6 is a top perspective view of the composting toilet assembly of FIG. 1, further depicted with a lid in a partially raised position.

The diversion plate 170 can have a sloped surface 176 configured to divert liquid waste through a small opening 178 under the second partition 164 and onto the drain pan 152. In particular, the sloped surface 176 of the diversion plate 170 can have an angle of about 10 to about 12 degrees in certain embodiments, as shown in FIG. 6. In operation, excess or splashing urine can undesirably enter the solids receptacle 146 and make contact with the diversion plate 170 in the closed position. The sloped surface 176 of the diversion plate 170 in the closed position can direct the liquid waste through the small opening 178 under the second partition 164 and onto the drain pan 152. A skilled artisan can select other suitable methods of diverting undesirable liquids from the diversion plate 170 to the drain pan 152.

The diversion plate 170 can be actuated by a user sitting on the composting toilet assembly 100 either manually or automatically using a handle 180 on the housing 102 of the composting toilet assembly 100. In particular, the handle 180 can be pulled to actuate the actuator 174, which as described hereinabove, can move the diversion plate from the closed position to the open position. The actuator 174 can be configured to automatically close the diversion place after a predetermined amount of time. Alternatively, the diversion plate 170 can remain in the open position until the user actuates the handle 180 to move the diversion plate into the closed position. It should be appreciated that the diversion plate 170 can be actuated by any suitable method as contemplated by the present disclosure.

Figure 3:
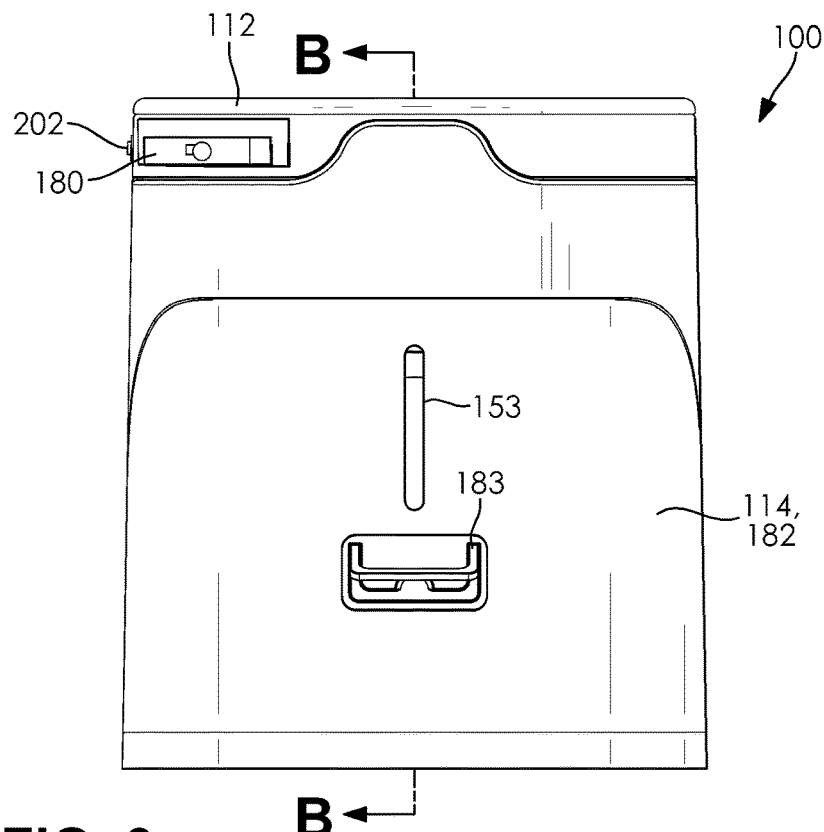
FIG. 3 is a front elevational view of the composting toilet assembly shown in FIG. 1.
Figure 5:
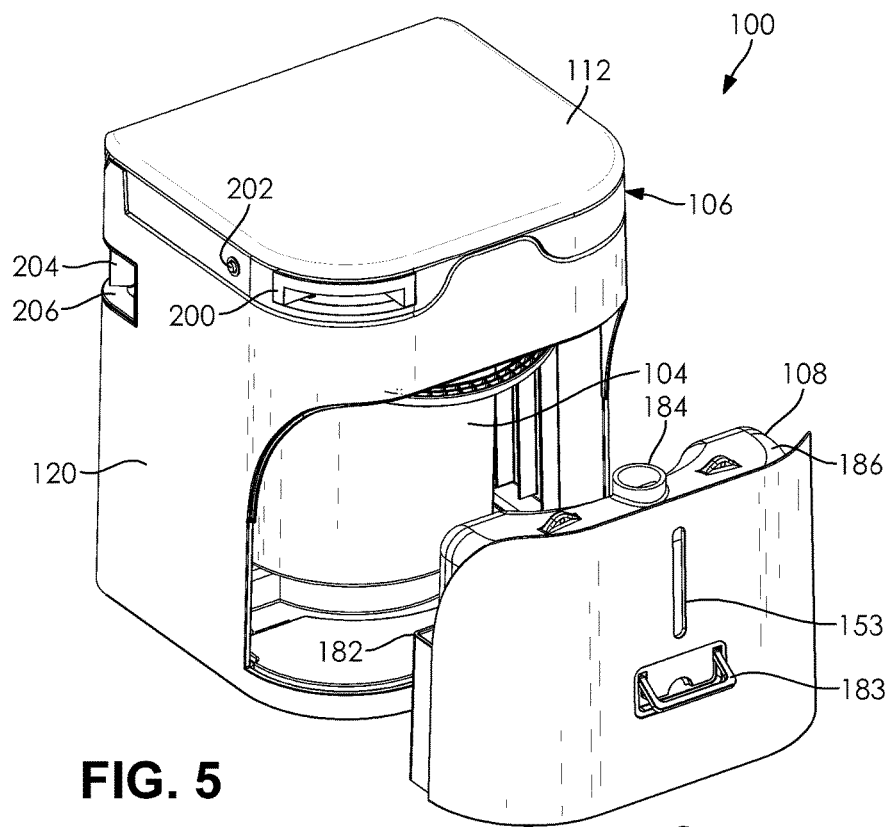
FIG. 5 is a top perspective view of the composting toilet assembly of FIG. 1, further depicted with a compartment removed from a housing.

With renewed reference to FIG. 5, the liquid waste bottle 108 can be removably disposed in a compartment 182 integrally formed in the front wall 114 of the housing 102. While in the compartment 182, the liquid waste bottle 108 can be disposed below the first opening 150 of the urine receptacle 148 and the drain opening 154 of the drain pan 152. The compartment 182 can have a view slot 153 formed therein, as shown in FIG. 3. The view slot 153 can allow a user to see the liquid waste bottle 108 without removing the bottle 108 from the compartment 182.

Advantageously, the liquid waste bottle 108 can be removed from the composting toilet assembly 100 by pulling the compartment 182 out from the housing 102 using the front wall 114 and subsequently pulling the liquid waste bottle 108 out of the compartment 182. A handle 183 can be disposed in the front wall 114. Advantageously, the handle 183 can be utilized by the user to remove the compartment 182 from the housing 102.

Alternatively, the liquid waste bottle 108 can be accessed by lifting the lid 112 and the toilet bowl 106 in an upward motion and pulling the liquid waste bottle 108 out of the compartment 182 and up through the opening 126 of the housing 102. The compartment 182 can secure the liquid waste bottle 108 in place militating against undesirable spills during operation. A skilled artisan can select any suitable means for securing the liquid waste bottle 108 in the housing 102, as desired.

In further embodiments, the compartment 182 can be slidably disposed in the housing 102. More particularly, the housing 102 and the compartment can be connected via a drawer slide (not shown). The compartment 182 can have a male portion of the drawer slide. The housing 102 can have a female portion of the drawer slide, and the female portion can slidably receive the male portion. In operation, the user can slide the compartment 182 out of the housing 102, as desired.

An intake aperture 184 can be formed through a top wall 186 of the liquid waste bottle 108. The intake aperture 184 can be in fluid communication with the drain opening 154 of the drain pan 152. The intake aperture 184 can be directly or indirectly connected to the first opening 150 of the urine receptacle 148. In operation, urine can pass from the urine receptacle 148 of the toilet bowl 106, through the first opening 150, and onto the drain pan 152. The urine can then pass through the drain opening 154, into the intake aperture 184, and can be stored in the liquid waste bottle 108. Likewise, excess or splashing urine can be directed from the diversion plate 170, through the small opening 178 onto the drain pan 152 and through the drain opening 154 and the intake aperture 184.

In certain embodiments, the intake aperture 184 can be circumscribed by a lip (not shown). The lip can be formed on the top wall 186 of the liquid waste bottle 108. The lip can be configured to receive a lid (not shown). The intake aperture 184 can form a seal with the drain opening 154 using one or more rubber washers (not shown). A skilled artisan can select any suitable method for connecting the liquid waste bottle 108 to the drain opening 154 in operation, as desired.

The liquid waste bottle 108 can include a sensor or liquid indicating light (not shown) to indicate when the liquid waste bottle 108 is full. The sensor or liquid indicating light can be disposed through the front wall 114 of the housing 102 or on the lid 112. A skilled artisan can select any suitable sensor or liquid indicating light, and any suitable location, as desired.

The liquid waste bottle 108 can also have a grab handle (not shown). A skilled artisan can select any suitable shape and placement for the grab handle, as desired.

With renewed reference to FIGS. 4, 7, and 11, the composting bin 104 can have an agitator 188 disposed on a bottom surface 190 of the composting bin 104. The agitator 188 can have one or more arms 192. A skilled artisan can select any suitable number and arrangement for the one or more arms 192, as desired. The partial structure of the agitator 188 depicted in FIGS. 4, 7-8, and 11 represents a generally spiral shaped agitator. It should be appreciated that the present disclosure contemplates a variety of suitable shapes for the one or more arms 192. Though certain shapes are depicted herein, a skilled artisan can select other suitable shapes for the one or more arms 192.

In certain embodiments of the disclosure, the bottom surface 190 of the composting bin 104 can have a raised, cone-shaped portion 194 housing a motor 196. The motor 196 can be disposed in a cone-shaped housing 195 integrally formed in the base 110 and adapted to fit within the cone-shaped portion 194 of the composting bin 104. The motor 196 can attach permanently to the base 110 of the housing 102 using screws or bolts, as non-limiting examples.

The agitator 188 can be removably connected to and powered by the motor 196. In certain embodiments, a bearing 198 on the motor 196 removably receives a rod 200 from the agitator 188. Advantageously, the composting bin 104 with the agitator 188 disposed therein can be disconnected from the motor 196 and removed from the housing 102 by pulling the composting bin 104 upward through the opening 126 of the housing 102. The rod 200 pulls away from the bearing 198 thereby allowing the agitator 188 to separate from the motor 196 when the composting toilet assembly 100 is not in use. Other non-motorized mechanical means for actuating the agitator 188 can be employed by a skilled artisan.

In another embodiment, the agitator 188 and the motor 196 can be removably connected via a gear coupling assembly (not shown). The gear coupling assembly can include a female portion and a male portion. The agitator 188 can be disposed on the rod 200. The rod 200 can be disposed through a bottom of the composting bin 104 and disposed in the male portion of the gear coupling assembly. The male portion can be removably disposed in the female portion. The female portion can be connected to and actuated by the motor 196.

In operation, after the user is finished using the toilet bowl 106, the user can activate the motor 196 using a button 202 disposed on the outside of the housing 102, as a nonlimiting example. The activated agitator 188 can then mix the fecal matter, including any other materials such as peat moss or sawdust. Advantageously, the agitator 188 can mix and aerate the composting mixture, which can provide a more even compost.

The composting bin 104 can further have a fan assembly (not shown) including one or more hose adaptors 204 integrally formed in the housing 102. Advantageously, the hose adaptors 204 are inset and do not project outwardly from the housing 102, permitting a compact and convenient design. The fan assembly can force air into and out of the composting bin 104. Advantageously, the fan assembly can militate against an undesirable odor near the composting toilet assembly 100. Further, airflow from the fan assembly can improve the overall quality of the compost mixture in the composting bin 104.

In further embodiments, for example as shown in FIG. 5, the hose adapters 204 can be rotatable about a corner 206 of the toilet assembly 100. Advantageously, the user can adjust the rotation of the hose adapter 204 to allow the toilet assembly 100 to be used in a variety of configurations without being limited by the location of the hose adapter 204.

Advantageously, the composting toilet assembly 100 militates against the undesirable mixing of urine and liquid waste in the composting bin 104 by automatically separating urine and fecal matter, in operation, and by directing excess liquid to the liquid waste bottle 108. Further, the composting toilet assembly 100 is compact, does not have parts projecting outwardly from the housing, is made from a durable material, and has features configured to improve the ease of use for the customer.

It should be appreciated that the composting toilet assembly 100 of the present disclosure is configured to be compact. Additionally, the housing 102 of the composting toilet assembly 100 is generally free of any projections. The compact nature of the housing 102 can make the composting toilet assembly 100 particularly well suited for use in recreational vehicles such as motorhomes, campervans, caravans, fifth-wheel trailers, popup campers, and truck campers.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments can be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions, and methods can be made within the scope of the present technology, with substantially similar results.

What is claimed is:
1. A composting toilet assembly, comprising:
a housing, the housing forming an enclosed cavity and a removable compartment integral to a wall of the housing;
a toilet bowl having a main body disposed in the housing;

a drain pan disposed under the toilet bowl and in fluid communication with the toilet bowl;

a diversion plate disposed under the toilet bowl, and in communication with the drain pan, the diversion plate slidably connected to a rail disposed on an interior of the housing, the diversion plate moveable from a position below the toilet bowl to a position above the drain pan;

a liquid waste bottle removably disposed in the removable compartment of the housing, the liquid waste bottle in fluid communication with the drain pan and configured to receive liquid waste from the drain pan; and a composting bin disposed in the enclosed cavity of the housing, the composting bin adjacent to and in communication with the diversion plate.

2. The composting toilet assembly of claim 1, wherein the housing includes a base, a lid, a front wall, a rear wall, a first side wall, and a second side wall forming the enclosed cavity.

3. The composting toilet assembly of claim 2, wherein the removable compartment is integrally formed as a portion of the front wall, first side wall and second side wall of the housing.

4. The composting toilet assembly of claim 3, wherein the liquid waste bottle can be removed from the composting toilet assembly by lifting the lid and the toilet bowl and removing the liquid waste bottle through the enclosed cavity of the housing.

5. The composting toilet assembly of claim 3, wherein the liquid waste bottle can be removed from the composting toilet assembly by pulling the removable compartment out from the front wall of the housing and removing the liquid waste bottle from the removable compartment.

6. The composting toilet assembly of claim 3, wherein the removable compartment includes a view slot formed therein, which allows a user to see the liquid waste bottle without removing the liquid waste bottle from the compartment.

7. The composting toilet assembly of claim 2, wherein an agitator is disposed on a bottom surface of the composting bin, and wherein the agitator has a prong.

8. The composting toilet assembly of claim 7, wherein an agitator motor is housed in an insert disposed on the base wall.

9. The composting toilet assembly of claim 8, wherein a bearing on the agitator motor removably receives a rod from the agitator when the composting bin is placed in the enclosed cavity and the composting toilet assembly is in use.

10. The composting toilet assembly of claim 2, wherein a hose adapter disposed in one of the first side wall and the second side wall is inset and does not project outwardly from the housing.

11. The composting toilet assembly of claim 10, wherein the hose adapter is rotatable about a corner of the toilet assembly.

12. The composting toilet assembly of claim 2, wherein the housing has a substantially uniform rectangular cross section.

13. The composting toilet assembly of claim 1, wherein the toilet bowl includes a recess having a first portion and a second portion, a partition wall disposed in the recess between the first portion and the second portion, a first opening in the first portion for receiving urine, a second opening in the second portion for receiving fecal matter.

14. The composting toilet assembly of claim 13, wherein the drain pan is disposed under the first portion of the toilet bowl and in fluid communication with the first opening.

15. The composting toilet assembly of claim 13, wherein the diversion plate is disposed under the second portion of the toilet bowl and in communication with the second opening of the toilet bowl.

16. The composting toilet assembly of claim 13, wherein, the liquid waste bottle includes an intake aperture in fluid communication with a drain opening disposed in a bottom surface of the drain pan.

17. The composting toilet assembly of claim 1, wherein the diversion plate is moveable between a closed position and an open position, and the diversion plate allows fecal matter into the composting bin in the open position.

18. The composting toilet assembly of claim 1, wherein the diversion plate includes a sloped surface, which is configured to divert excess or splashing urine waste through a small opening and onto the drain pan when the diversion plate is in a closed position.

19. A composting toilet assembly, comprising:
a housing having a base, a lid, a front wall, a rear wall, a first side wall, and a second side wall forming an enclosed cavity and a removable compartment integral to the front wall, first side wall and the second side wall;

a toilet bowl having a main body, the main body having a seat portion;
a recess having a first portion and a second portion,
a partition wall disposed in the recess between the first portion and the second portion, the partition wall extending upwardly and having a top edge,
a first opening in the first portion for receiving urine,
a second opening in the second portion for receiving fecal matter,
a drain pan disposed under the first portion of the toilet bowl and in fluid communication with the first opening,
a diversion plate slidably connected to a rail disposed on an interior of the housing, the diversion plate disposed under the second portion of the toilet bowl and in communication with the second opening of the toilet bowl and in communication with the drain pan, the diversion plate moveable from a position below the toilet bowl to a position above the drain pan;

a liquid waste bottle removably disposed in the removable compartment, the liquid waste bottle having an intake aperture in fluid communication with a drain opening disposed in a bottom surface of the drain pan and configured to receive urine and liquid waste from the drain pan; and a composting bin disposed in the enclosed cavity of the housing, the composting bin adjacent to and in communication with the diversion plate and the second opening, the composting bin having an agitator.

* * * * *